United States Patent
Fisch et al.

(10) Patent No.: US 8,842,447 B2
(45) Date of Patent: Sep. 23, 2014

(54) DC POWER SUPPLY WITH LOW POWER LOSS

(71) Applicant: Minebea Co., Ltd., Nagano-ken (JP)

(72) Inventors: Josef Fisch, Petersberg/Erdweg (DE); Mykhaylo Raykhman, Munich (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 13/661,171

(22) Filed: Oct. 26, 2012

(65) Prior Publication Data

US 2013/0107593 A1 May 2, 2013

(30) Foreign Application Priority Data

Oct. 28, 2011 (DE) .......... 10 2011 117 387

(51) Int. Cl.
*H02M 3/335* (2006.01)
*H02M 7/217* (2006.01)
*H02M 1/00* (2006.01)

(52) U.S. Cl.
CPC ...... *H02M 7/217* (2013.01); *H02M 2001/0045* (2013.01)
USPC ......... 363/18; 363/19; 363/21.04; 363/21.08; 363/89

(58) Field of Classification Search
USPC ........ 363/16, 18, 19, 20, 21.04, 21.06, 21.07, 363/21.08, 21.09, 21.1, 21.12, 21.14, 21.15, 363/21.16, 21.17, 21.18, 81, 84, 89, 95, 97
See application file for complete search history.

(56) References Cited

U.S. PATENT DOCUMENTS

| | | | | |
|---|---|---|---|---|
| 5,812,383 | A | * | 9/1998 | Majid et al. ................. 363/21.05 |
| 6,205,036 | B1 | * | 3/2001 | Anzawa ........................... 363/20 |
| 7,911,081 | B2 | * | 3/2011 | Cyr .................................. 307/31 |

FOREIGN PATENT DOCUMENTS

DE  3736336  4/1988

* cited by examiner

*Primary Examiner* — Nguyen Tran
(74) *Attorney, Agent, or Firm* — Volpe and Koenig, P.C.

(57) ABSTRACT

A DC power supply (1) having a series regulator (2) for generating a fixed output DC voltage (VCC) at a variable input AC voltage (VAC) with low power loss. For this purpose, the DC power supply (1, 101, 201, 301) has a transformer (3, 103) having at least two auxiliary windings (W1, W2) having different numbers of windings that can each be connected via a switching device (4, 104, 204, 304) to the series regulator (2). Switching is effected such that the power loss is kept as low as possible.

8 Claims, 3 Drawing Sheets

DC POWER SUPPLY WITH LOW POWER LOSS

INCORPORATION BY REFERENCE

The following documents are incorporated herein by reference as if fully set forth: German Patent Application No. 102011117387.4, filed Oct. 28, 2011.

BACKGROUND

The invention is directed to a DC power supply used to provide a fixed, regulated DC voltage having a transformer having a primary winding and having an auxiliary winding that is connected to a voltage converter which has a rectifier and a linear or series regulator.

This kind of DC voltage converter is generally known and shown in FIG. 1 by way of example.

The transformer has a primary winding that can be connected to an AC voltage source such as the mains voltage.

The auxiliary winding is connected via a rectifier diode D1 to a series regulator that is made up of a transistor Q1, a zener diode ZD1 and a resistor R1. For smoothing and buffering, two capacitors C1 and C2 are optionally provided as well. The output DC voltage VCC is here determined by the zener voltage of the zener diode ZD1.

Due to the voltage drops at the components used, the input voltage of the voltage converter, i.e. the auxiliary voltage of the auxiliary winding, has to be several volts over the output voltage VCC. However, if the input voltage is much higher, very high power losses occur at the series regulator.

These kinds of simple DC power supplies are used, for example, to operate electrical equipment from the mains grid.

However, the mains voltage is subject to certain grid-related fluctuations, so that the circuit has to be dimensioned for the lowest possible AC voltage. In addition, the mains voltage varies between different countries. To enable an electrical device to be operated worldwide, it has to be designed for an input AC voltage of between 90 VAC and 265 VAC.

Here, the linear regulator has to be dimensioned such that it generates the desired DC voltage even at the lowest input AC voltage. In the given AC voltage range, the input voltage at the voltage converter could change by almost a factor of three. This causes a vast increase in the power loss at the series regulator.

To avoid having to design a series regulator for such a large power loss, it is generally known to provide a switching mechanism in the voltage supply which allows the voltage to be adjusted to the respective mains voltage. This switching mechanism is generally a switch that has to be manually operated. Manual switching, however, is prone to error since it can be forgotten. Faulty adjustment means the destruction of the electrical device.

Thus from DE 37 36 336 A1 an automatic switching mechanism is known which makes manual selection of the mains voltage unnecessary. This circuit has a transformer having two windings that are designed such that the first secondary winding is active at a high mains voltage of between 220 VAC and 240 VAC and the second secondary winding is active at a low mains voltage of between 100 VAC and 120 VAC and each delivers the same output voltage. Depending on the output voltage, one of the secondary windings, either the first or the second secondary winding, is here connected automatically to the constant voltage element E via a control means D. The constant voltage element contains the voltage regulator that is not described in more detail.

Here however, the mains voltage is limited to the two narrow mains voltage ranges, otherwise the power loss would be too great.

However, the mains voltage may also be subjected to much greater fluctuations, particularly in less developed regions or when the grid load is high.

For such cases, DC power supplies are realized using switching regulators which, however, are much more costly.

A considerable disadvantage of a switching regulator is that a control unit is necessary for its operation that controls the switch or the switches and assumes other control and monitoring functions. This control unit requires a regulated DC voltage that is not necessarily available in the switching regulator. This operating voltage for the self-supply of the switching regulator is generally generated via a DC voltage source having a series regulator, as described above, that is supplied from a separate auxiliary winding.

The separate auxiliary winding is normally found as an auxiliary winding on the power transformer of the switching regulator. Again in this arrangement, the output voltage of the auxiliary winding thus fluctuates with the input AC voltage, so that the power loss of the self-supply may be very high, as described above.

SUMMARY

The object of the invention is thus to provide a DC power supply of the type mentioned above that has lower power loss over a wide input AC voltage range and that can be particularly used as a self-supply of a voltage supply.

This object has been achieved with a voltage supply having one or more features of the invention.

In the first embodiment of the invention, the series regulator can be connected via a switching device to various auxiliary windings. Each auxiliary winding has a different number of windings and thus a different voltage, where one auxiliary winding may be the sub-winding of another auxiliary winding. The winding direction of the primary and auxiliary windings may differ, likewise it is not absolutely necessary for the auxiliary windings among themselves to have the same winding direction. Thus the voltages at the auxiliary windings can be dependent on the primary (input) and/or secondary voltages (output). Depending on the input AC voltage and the voltages at the auxiliary windings, the auxiliary winding is connected through the switching device to the series regulator that shows the least difference to the desired output voltage. The functioning of the series regulator thereby assumes a slightly higher voltage at the auxiliary winding at least in terms of amount than the desired output voltage. This makes it a simple matter to reduce the power loss at the series regulator.

Only two auxiliary windings are needed to considerably reduce the power loss in a typical power supply unit having an input voltage range of 90 VAC to 265 VAC.

Depending on the desired maximum power loss, however, more than two auxiliary windings with closely stepped numbers of windings can be used.

The switching device itself may be any 1:N switch that has, for example, relays, transistors or other switching elements. The switching device moreover has a control signal input at which a switching signal for switching the switching device is received. This switching signal can be generated either manually or preferably automatically.

For this purpose, it is expedient if a monitoring device for monitoring at least one reference value is provided, the monitoring device being connected to the control signal input of the switching device and switching of the switching device being effected according to this reference value.

The reference value may, for example, be the input AC voltage, the input voltage of the series regulator, a temperature at the series regulator or the power loss of the series regulator. A plurality of reference values in any logical link may be used as the switching signal.

It is particularly expedient if the input AC voltage is used as the reference value and switching of the auxiliary windings is effected according to the input AC voltage such that the difference between the input voltage and the output voltage at the series regulator is as low as possible. This inevitably produces the lowest possible power loss.

In an advantageous embodiment of the invention, the transformer has two auxiliary windings for the DC power supply. Irrespective of these, the transformer may have further auxiliary windings that are not provided for purposes of switching.

In a development on this embodiment, the switching device has a first transistor, preferably a pnp bipolar transistor, whose emitter-collector path is disposed between the rectifier of the second auxiliary winding and the series regulator. Moreover, the base of the first switch is connected via a resistor to the collector-emitter path of a second transistor, preferably an npn bipolar transistor, and the base of the second switch acts as the control signal input. Using the control signal, the transistor switches can be switched to a conductive or blocking state, whereby either the first or the second auxiliary winding is connected to the series regulator.

In addition, the circuit may have a transistor as a monitoring device, preferably an npn bipolar transistor, whose base is connected to the anode of the zener diode of the series regulator and whose collector is connected to the control signal input of the switching device. This allows simple monitoring of the voltage of the second auxiliary winding and automatic switching.

It is particularly expedient if the second auxiliary winding has twice as many windings as the first auxiliary winding.

Alongside the stand-alone application of the DC voltage converter according to the invention, it can be used in particular for the self-supply of a voltage supply, for example, for a switching regulator.

This kind of voltage supply has a power transformer that has a primary winding and auxiliary windings, a rectifier and a control unit that controls the individual components of the voltage supply, such as a switching regulator. For the self-supply of the control unit, a DC power supply according to the invention is provided, the auxiliary windings being disposed as auxiliary windings on the power transformer.

In this kind of arrangement, it is expedient if the monitoring device is disposed in the control unit that generates the control signal for switching the switching device.

A second independent embodiment of the invention, for which independent patent protection is sought, is based on the fact that, instead of the two auxiliary windings, now two series regulators having different output DC voltages are connected in series. The first series regulator is dimensioned such that it provides the desired output DC voltage VCC. The second series regulator is connected in series upstream of the first series regulator, so that it is disposed between the auxiliary winding and the first series regulator. The output DC voltage of the second series regulator makes an intermediate voltage available that acts as the input voltage of the first series regulator. By connecting two or more series regulators in series, the power loss to the individual series regulator is divided up, causing the overall power loss to decrease. In addition, the load on the components within the individual series regulators is reduced, so that they can be made smaller.

The second series regulator is preferably designed such that its output DC voltage, i.e. the intermediate voltage, is the same as the input voltage, provided the input voltage is less than the fixedly set output DC voltage. If the input voltage is greater than this fixed voltage value, it is regulated to this fixed voltage value.

It is particularly expedient if the regulated output DC voltage of the second series regulator is greater than the minimum output voltage of the auxiliary winding. This ensures that when the input voltage is low, there is no power loss at the second series regulator. If the input voltage is higher, the power loss is distributed between the two series regulators.

BRIEF DESCRIPTION OF THE DRAWINGS

The invention is described in more detail below on the basis of embodiments with reference to the enclosed drawings.

The Figures show.

DETAILED DESCRIPTION OF THE PREFERRED EMBODIMENTS

Figure 2:
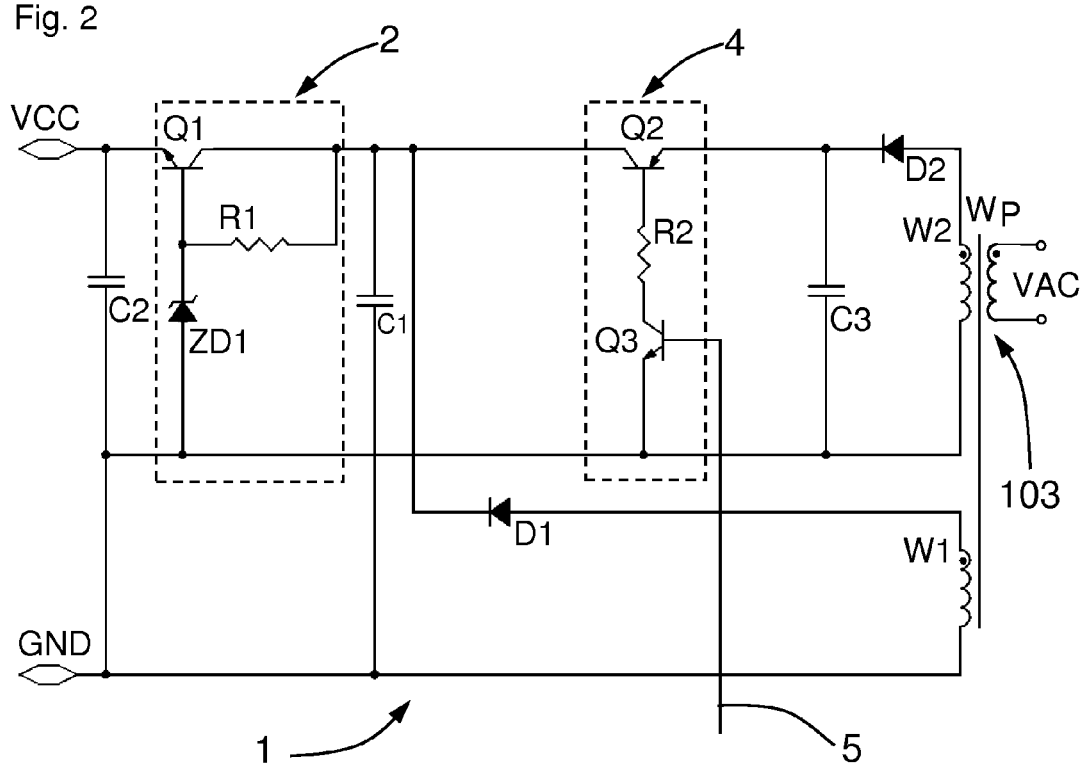
FIG. 2 a DC power supply according to the invention having two auxiliary windings and a switching device having a control input, FIG. 3 a DC power supply according to the invention having two auxiliary windings and an automatic switching device, FIG. 4 a voltage supply having a DC power supply according to the invention as the self-supply for a control unit, and FIG. 5 an alternative embodiment of the DC power supply according to the invention of FIG. 3.

In FIG. 2 an exemplary embodiment of a DC power supply 1, 101, 201, 301 according to the invention is shown having two auxiliary windings W1 and W2. The DC power supply 1, 101, 201, 301 delivers a regulated DC voltage VCC at a variable AC voltage source. The circuit may, for example, be designed for operation from the mains grid where the input AC voltage may vary between 90 VAC and 265 VAC.

Figure 1:
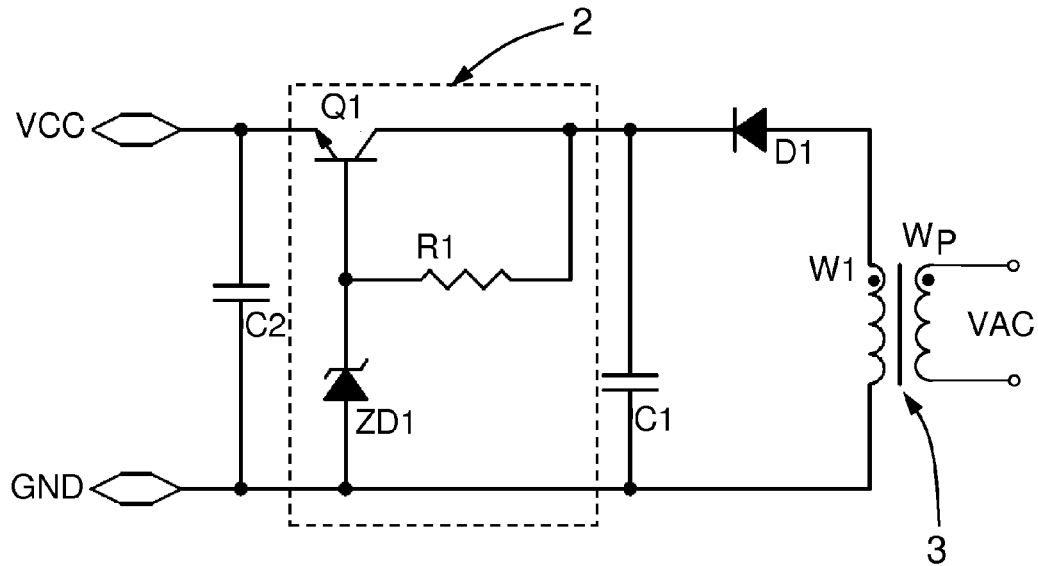
FIG. 1 a DC power supply having a series regulator according to the prior art.

The series regulator 2 and the first auxiliary winding W1 correspond to the prior art illustrated in FIG. 1.

In addition, the transformer 103 has a second auxiliary winding W2. The second auxiliary winding W2 has a greater number of windings than the first auxiliary winding W1. In particular, the number of windings of the second auxiliary winding W2 is twice the number of those of the first auxiliary winding W1. Accordingly, the voltage U2 of the second auxiliary winding W2 is higher, particularly twice as high, as the voltage U1 of the first auxiliary winding W1.

Both auxiliary windings W1, W2 are each connected to a rectifier diode D1, D2, where W1 may be a sub-winding of W2.

According to the invention, the DC power supply 1, 101, 201, 301 has a switching device 4 that is connected downstream of the second rectifier diode D2. The switching device 4 has a transistor, preferably a pnp bipolar transistor Q2, whose emitter is connected to the cathode of the rectifier diode D2 and whose collector is connected to the series regulator 2. The base is connected via a resistor R2 to the collector of a further npn bipolar transistor Q3. Its emitter is connected to ground and the base acts as a switching signal input 5 for the switching device.

The second auxiliary winding W2 is dimensioned such that its voltage U2 at the lowest input AC voltage VAC is large enough compared to the desired DC voltage VCC to allow regulation to the output voltage VCC. If the input AC voltage VAC now increases, due to the fixed transfer ratio of the auxiliary windings, the two voltages U1 and U2 of the two auxiliary windings increase. This results in an initial increase in the power loss at the series regulator.

If the voltage U1 of the first auxiliary winding W1 is now sufficiently greater than the VCC, the switch is operated via the control signal, so that the first auxiliary winding W1 is connected to the series regulator 2. Compared to the now higher output voltage U2 of the second auxiliary winding W2, the power loss at the series regulator thereby decreases.

Figure 3:
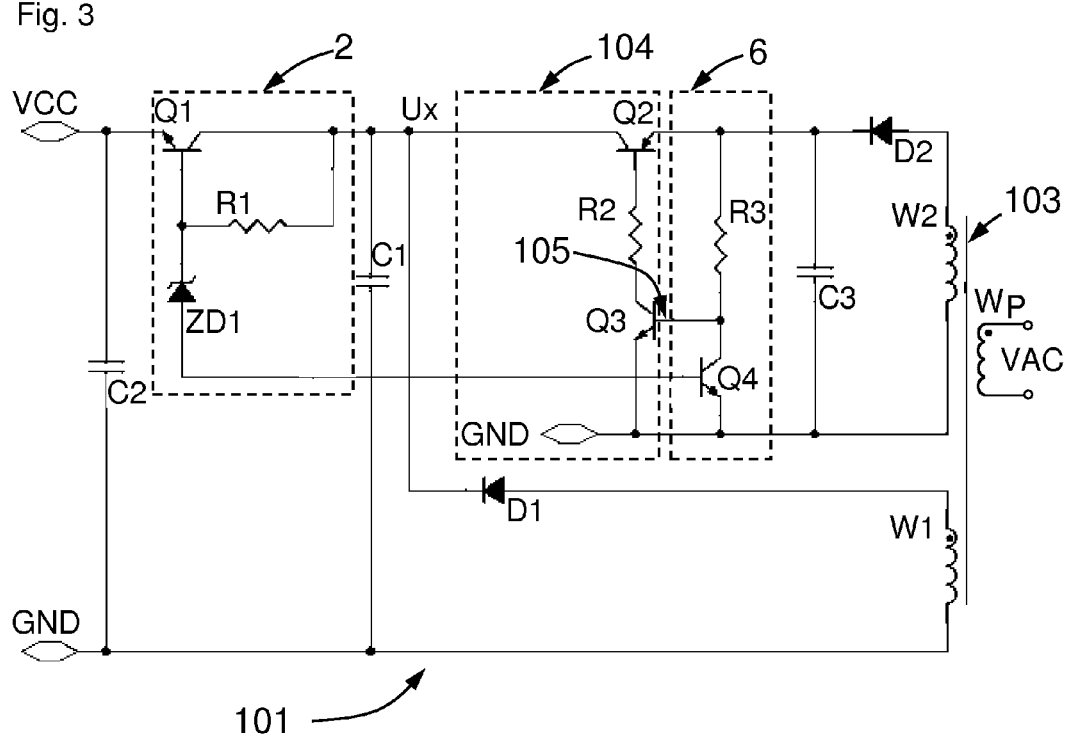

FIG. 3 shows an embodiment of the invention that substantially corresponds to that of FIG. 2.

The control signal input 105 of the switching device 104 is connected here to a monitoring device 6 that automatically effects switching according to the voltage at the first auxiliary winding W1.

The monitoring device 6 has an npn bipolar transistor Q4 whose base is connected to the anode of the zener diode ZD1 of the series regulator 2. The emitter is connected to ground and the collector is connected via a resistor R3 to the voltage U2 of the second auxiliary winding W2. The switching signal occurs between the resistor R3 and the collector which is why this node is directly connected to the base of the transistor Q3 of the switching device 4.

The second auxiliary winding W2 is dimensioned such that its voltage U2 is sufficient even at a minimum input AC voltage VAC to generate the output voltage VCC. This means the voltage U2 is several volts higher than the output voltage VCC. The first auxiliary winding has a fewer number of windings which is why its voltage U1 is lower.

In explaining functionality, it is first assumed that the input AC voltage VAC is low. Via R3, Q3 becomes conductive and thus Q2 as well. The series regulator 2 is thereby connected to the second auxiliary winding W2. If, with an increasing input AC voltage VAC, the input voltage at the series regulator 2 exceeds the nominal voltage of the zener diode ZD1 plus the base-emitter voltage Ube(Q4) of the transistor Q4 of the monitoring device 6, the series regulator becomes active and the output voltage VCC is made available.

This has the added consequence that the current through ZD1 brings the transistor Q4 into a conductive state which in turn reduces the current through Q3. This results in the base current through Q2 being decreased and the collector-emitter voltage at Q2 being increased. The input voltage at the series regulator 2 thereby remains constant, so that the power loss also remains constant.

As soon as the voltage U1 of the first auxiliary winding W1 exceeds this constant input voltage, current no longer flows through R3 and the transistors Q2 and Q3 of the switching device 6 block. The power supply of the series regulator 2 is then effected through the first auxiliary winding W1.

The effectiveness of the invention is to be proven on the basis of a specific example with reference to the circuits in FIG. 1 and FIG. 3.

The mains voltage acts as the input AC voltage that can vary between 90 VAC and 265 VAC.

The DC voltage VCC is to be 15 V at 20 mA current.

R1=8,2 k, R2=62 k, R3=330 k, ZD1=ca.15 V, W2:W1=2:1

The auxiliary windings are dimensioned such that the voltages Uin lie in the following ranges.

FIG. 1: W1: 16V-60V
FIG. 3: W1: 8V-30V
W2: 16V-60V

The voltage Umax is the maximum voltage at W2. Ux is the potential difference between the mid-point of Q2 and Q1 on the one hand and ground GND on the other hand. According to the functionality of the switching device 6 as described above, switching from W2 to W1 occurs as soon as the voltage Ux and the voltage at W1 is the same as the zener voltage ZD1. In the example, this happens as soon as the voltage at W1 is greater than 15 V. It can be clearly seen that the threshold value Ux is directly defined by the output voltage VCC that corresponds to the zener voltage. The maximum voltage at the series regulator is thus only 30 V instead of 60 V as in the prior art.

The maximum power losses are then as follows:

| Fig. 1 (SdT) | | Fig. 3 | U2 = 60 V | U2 = 30 V |
|---|---|---|---|---|
| P_Q1 | 900 mW | P_Q1 + P_Q2 | 300 mW | 300 mW |
| P_R1 | 247 mW | P_R1 | 27 mW | 0.2 mW |
| | | P_R2 | — mW | 15 mW |
| | | P_R3 | 11 mW | 3 mW |
| P_ZD1 | 82 mW | P_ZD1 | 27 mW | 2 mW |
| Total | 1.23 W | Total | 365 mW | 320 mW |

As can be clearly seen, the power loss for the DC voltage converter according to the invention is less than a third of the power loss of the circuit according to the prior art.

This reduction has been achieved with a slightly more complex circuit that only requires very little extra cost.

From the different operating states, the two following conditions can be derived, in which in the example there is maximum efficiency and an even distribution of loss between the transistors Q1 and Q2.

1. W1/W2=1/2
2. Umax=4*VCC

Also valid in the selected example:

3. Ux=Umax/4.

In order to minimize and optimally distribute losses, it may be advantageous if the threshold value Ux, at which switching between the two windings occurs, can be selected independently of the output voltage VCC. Here, the switching threshold Ux may also be selected such that the $3^{rd}$ condition above is no longer met.

Figure 5:
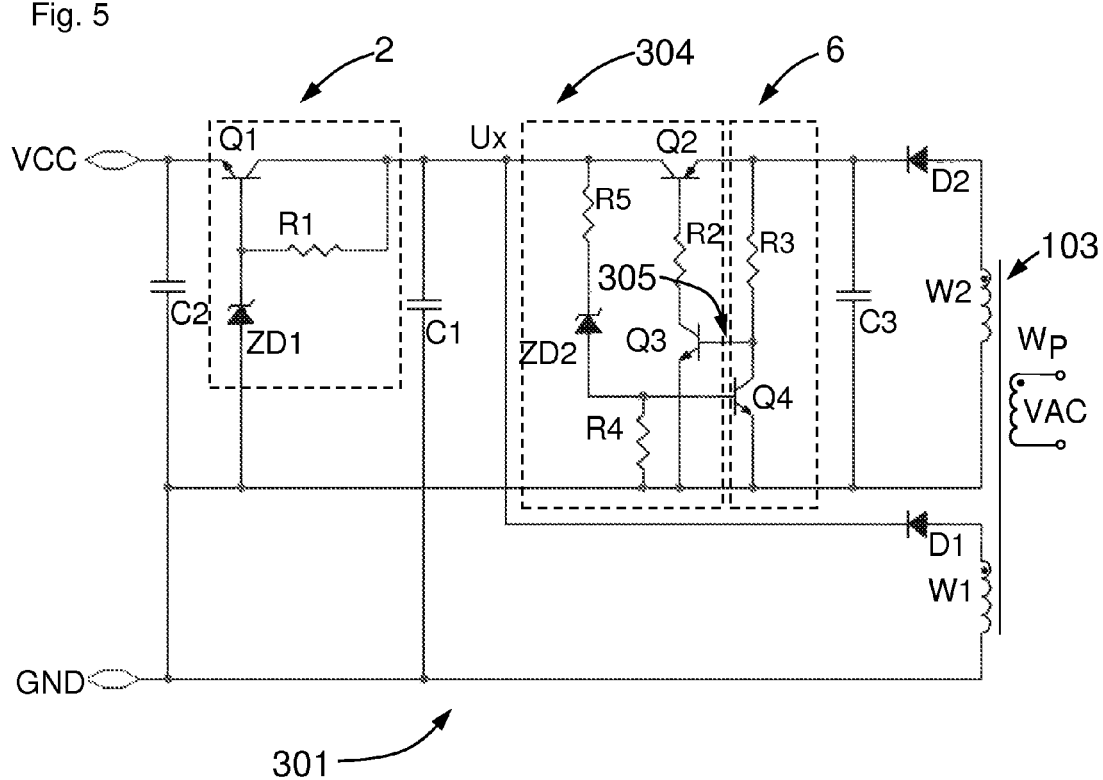

This is made possible by the circuit illustrated in FIG. 5, which substantially corresponds to the circuit of FIG. 3. Here, however, the zener diode ZD1 of the linear regulator 2 is connected to ground, as shown in FIG. 2. The base of the transistor Q4 on the other hand is connected via a further zener diode ZD2 and a resistor R5 to the input of the linear regulator 2 of the voltage and via a resistor R4 to ground GND. The threshold value Ux, at which the handover from W2 to W1 takes place, is now here determined by the zener voltage of the zener diode ZD2 independent of the output voltage VCC.

The functionality otherwise corresponds to the circuit in FIG. 3. As soon as the voltage at W1 corresponds to the zener voltage ZD2 or exceeds this voltage, the linear regulator 2 is connected, by Q2 being switched off, to the first auxiliary winding W1 that has a lower voltage than the auxiliary winding W2. The auxiliary winding W1 may be a sub-winding of the auxiliary winding W2.

In principle, it is also possible to use more than two auxiliary windings, so as to provide finer gradation of the voltages. This can be particularly helpful if the input AC voltage can fluctuate over a large range.

Irrespective of the number of the auxiliary windings, the circuit and the switching points may also be designed such that the power loss is optimized for specific operating conditions. Such an operating condition may, for example, be a specific input AC voltage that is present for most of the time.

By way of example, an electrical device having a PFC is assumed. At a 90 VAC input AC voltage, the PFC, for example, is switched off, so that the DC voltage is some 127 VDC. The auxiliary winding has, for example, a transfer ratio of 10:1, so that the voltage at the auxiliary winding is 12.7 V. In normal operation, the PFC is active and the DC voltage is 450 VDC. At the auxiliary winding 45 V accordingly.

Here, for example, two auxiliary windings may be used each of which are optimized for one of these two voltages, so that their output voltages lie just over the desired output voltage VCC. The auxiliary windings can then simply be switched over in accordance with the switching status of the PFC, so that there is no need for any costly voltage monitoring. Switching between the two auxiliary windings ensures that the linear regulator is optimally operated in both operating conditions and has minimum power loss.

The DC power supply according to the invention may be used, for example, as a stand-alone device, such as a power supply unit. However, it is also possible to use the DC power supply within an electrical device as the self-supply for a sub-circuit.

Figure 4:
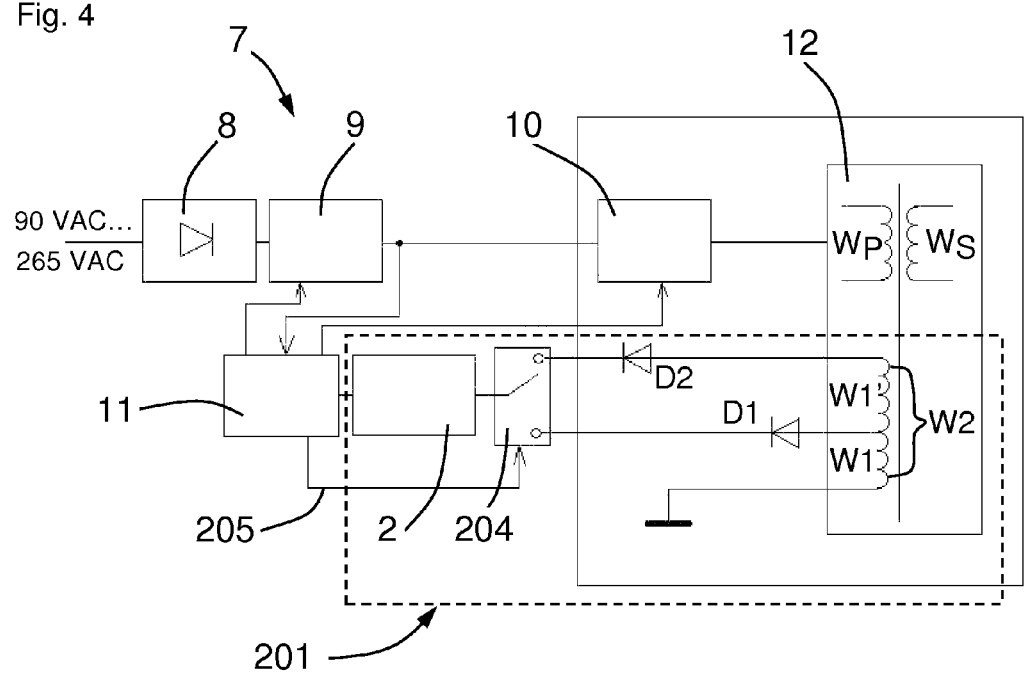

In FIG. 4, a power converter 7 having a rectifier 8, a power factor correction circuit (PFC) 9, a voltage converter 10, a controller 11 and a power transformer 12 is shown by way of example. The power converter 7 is designed for a mains voltage of between 90 VAC and 265 VAC. The precise function and application of the power converter 7 is of no relevance to the invention.

The controller 11 of the power converter 7 requires an operating voltage VCC that is realized here by a DC power supply 1' according to the invention. For this purpose, the power transformer 12 has two auxiliary windings W1 and W1' that in the example are designed as an auxiliary winding W2 having a center tap. Both auxiliary windings are each connected via a rectifier diode D1, D2 to a switching device 204. This is connected to a series regulator 2 that provides the operating voltage VCC for the controller 11.

When the PFC 9 is switched on, the voltages at W1 and W2 are considerably higher than when the PFC 9 is switched off. If the PFC 9 is switched on, i.e. if the voltage at the auxiliary windings is high, the first auxiliary winding W1 is connected to the series regulator 2 via the switching device 204. Otherwise, the second auxiliary winding Wr is also connected. Here, the two auxiliary windings W1 and Wr are connected in series and the voltage U2 at the auxiliary winding W2 is then the sum of the voltages at the two auxiliary windings W1 and Wr. If the auxiliary windings are designed to be separate, the second auxiliary winding Wr could also be connected separately. However, through the appropriate choice of windings, the method of wiring is irrelevant.

In this embodiment, a monitoring device is integrated in the controller 11, the switching status of the PFC 9 being specified here as the reference value. Alongside this, further reference values may be defined as switching criteria.

All the examples shown are simply used for purposes of illustrating the invention and are not limiting in any way.

REFERENCE NUMBERS 1, 101, 201, 301 DC power supply
2 series regulator
3, 103 Transformer
4, 104, 204, 304 Switching device
5, 105, 205, 305 Switching signal input
6 Monitoring device
7 Power converter
8 Rectifier
9 Power factor correction circuit
10 Voltage converter
11 Controller
12 Power transformer
C1, C2, C3 Capacitors
D1, D2 Rectifier diodes
GND Ground
Q1 Transistor series regulator
Q2 Transistor switching device
Q3 Transistor switching device
Q4 Transistor monitoring device
R1, R2, R3, R4, R5 Resistors
Umax Maximum input voltage at W2
Ube(Q1), Ube(Q4), Ube(Q11) Base-emitter voltages
U1, U2 Voltages of the auxiliary windings
Ux Voltage between Q1 and Q2
U(ZD1), U(ZD2), U(ZD4), U(ZD5) Zener voltages
VCC Output DC voltage
VAC Input AC voltage
W1, W1', W2 Auxiliary windings
Wp Primary winding
Ws Auxiliary winding
ZD1 Zener diode series regulator
ZD2 Zener diode switching device

The invention claimed is:

1. A DC power supply (1) for providing a fixed, regulated DC voltage (VCC) comprising a transformer (3; 103; 12) having a primary winding (Wp) and having an auxiliary winding (W1) that is connected via a rectifier (D1) to a series regulator (2), the transformer (3; 103; 12) has a second auxiliary winding (W2), wherein all of the auxiliary windings have a different number of windings, a switching device (4; 104; 204; 304) is provided through which the series regulator (2) is connectable to one of the auxiliary windings (W1, W2) and the switching device (4; 104; 204; 304) has a control signal input (5; 105; 205; 305) that is configured to receive a switching signal, and wherein the switching device (6) has a first transistor (Q2) having an emitter-collector path that is disposed between a rectifier (D2) of the second auxiliary winding (W2) and the series regulator (2), a base of a first transistor (Q2) is connected via a resistor (R2) to a collector-emitter path of a second transistor (Q3) and a base of the second transistor (Q3) acts as the control signal input (5).

2. A DC power supply according to claim 1, wherein a monitoring device (6) for monitoring at least one reference value is provided that is connected to the control signal input (5; 105; 205; 305) of the switching device (6) and switching of the switching device (6) takes place according to the at least one reference value.

3. A DC power supply according to claim 2, wherein an input AC voltage (VAC) acts as the reference value and switching of the auxiliary windings (W1, W2) thus takes place according to the input AC voltage (VAC), and a difference between the input voltage (U1, U2) and the output voltage (VCC) at the series regulator (2) is as low as possible.

4. A DC power supply according to claim 1, wherein the first transistor (Q2) is a pnp bipolar transistor and the second transistor (Q3) is an npn bipolar transistor.

5. A DC power supply according to claim 1, wherein the monitoring device (6) has an npn bipolar transistor (Q4) with a base that is connected to an anode of a zener diode (ZD1) of the series regulator (2) and with a collector that is directly connected to the control signal input (105) of the switching device (104).

6. A DC power supply according to claim 1, wherein the monitoring device (6) has an npn bipolar transistor (Q4) with a base that is connected via a zener diode (ZD2) to the second auxiliary winding (W2) and via a resistor (R4) to ground (GND) and with a collector that is directly connected to the control signal input (305) of the switching device (304).

7. A DC power supply according to claim 1, wherein the second auxiliary winding (W2) has twice as many windings as the first auxiliary winding (W1).

8. A DC power supply according to claim 1, wherein the second auxiliary winding (W2) is formed from a series circuit consisting of the first auxiliary winding (W1) and a further auxiliary winding (W1').

* * * * *